UNITED STATES PATENT OFFICE.

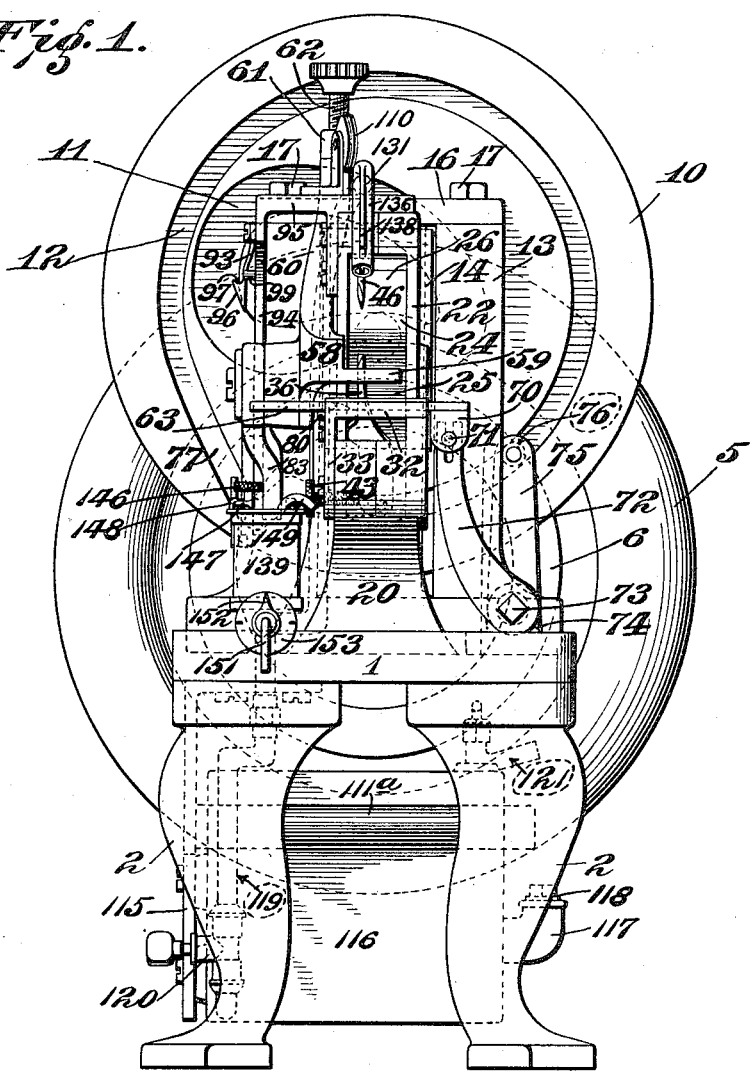

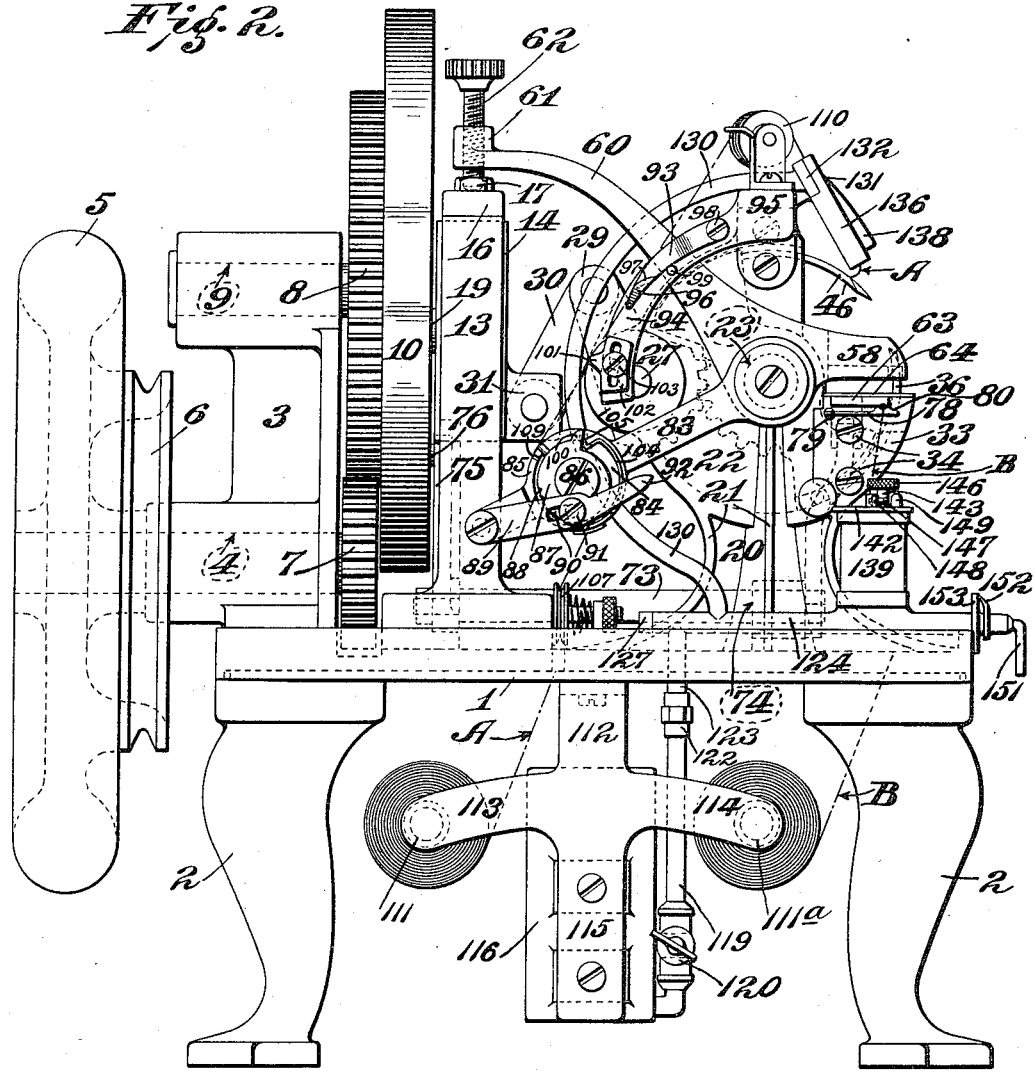

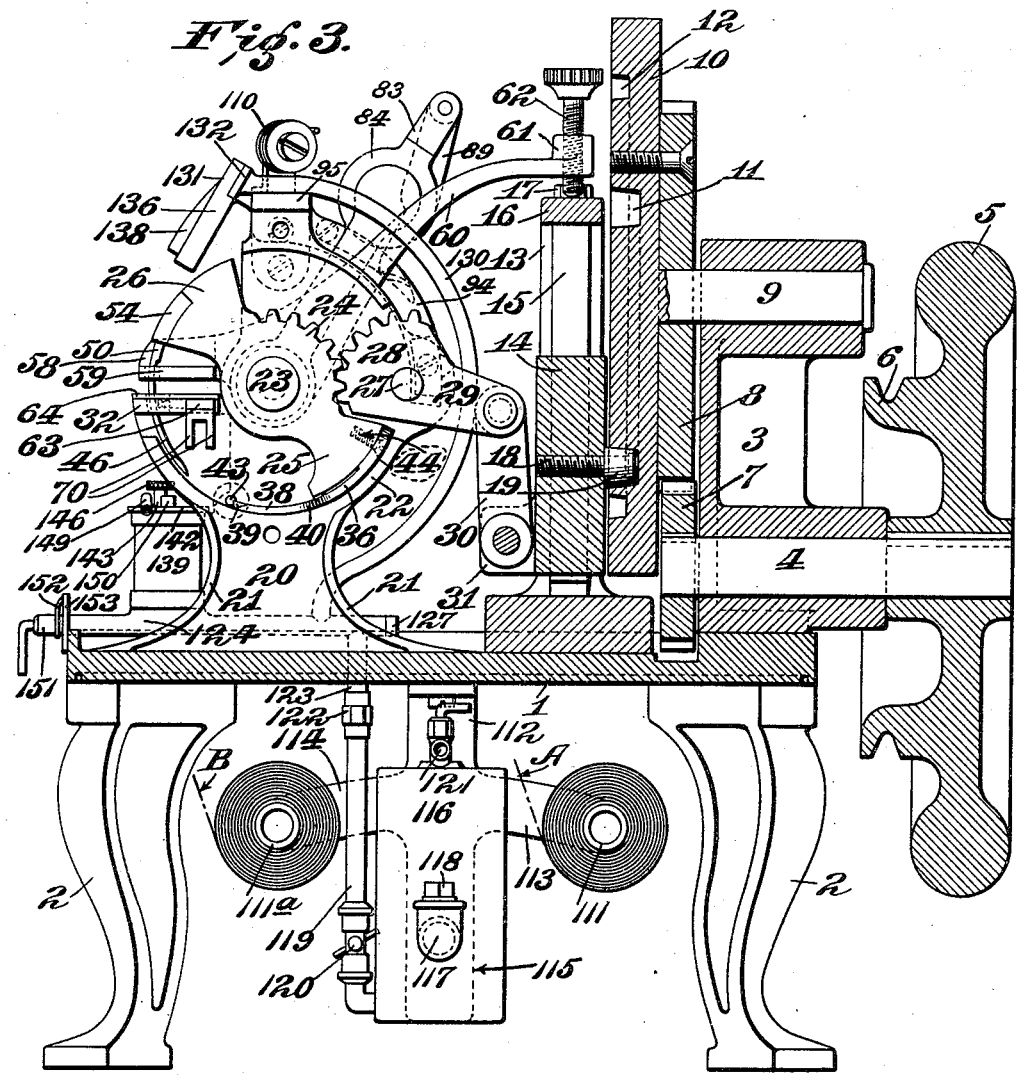

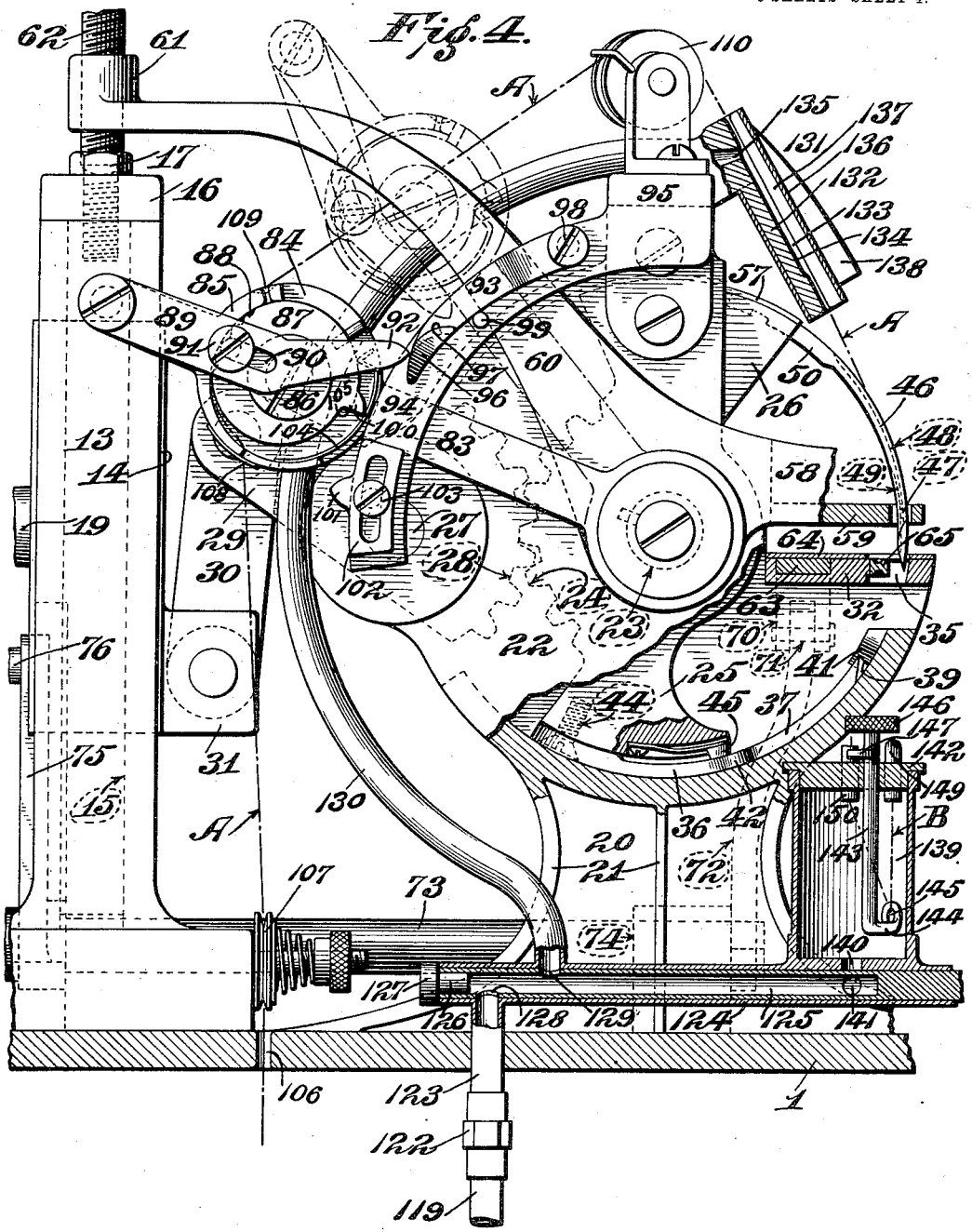

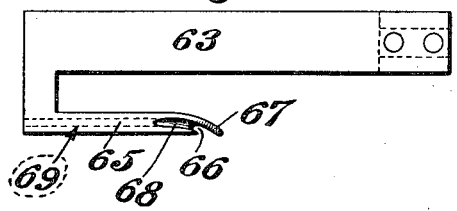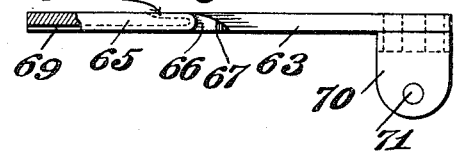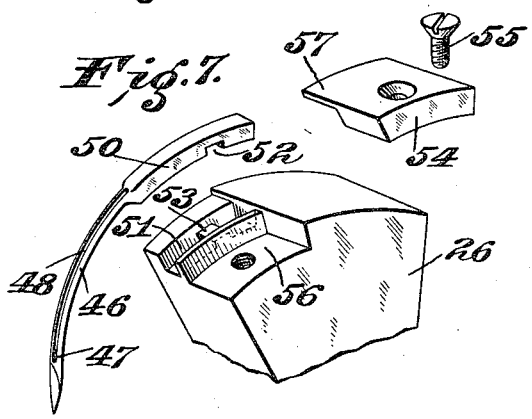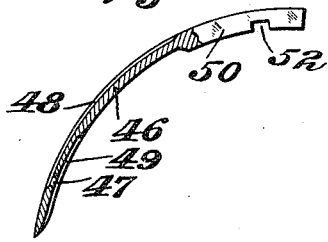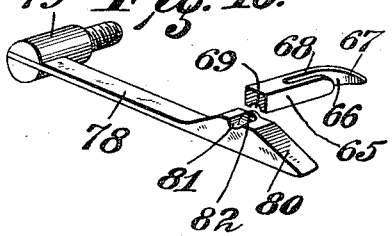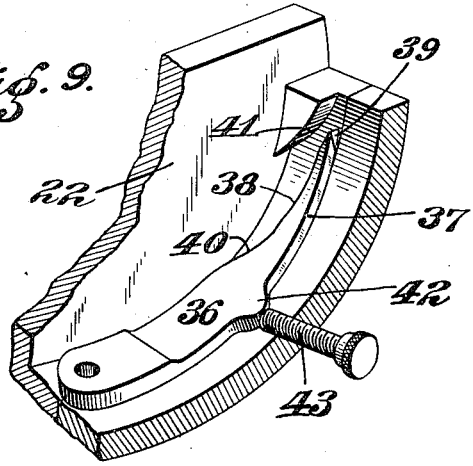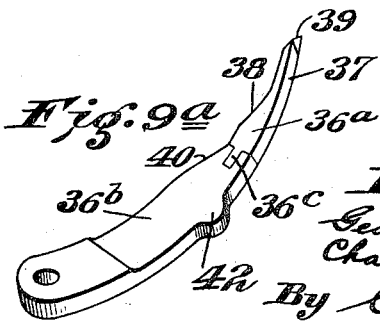

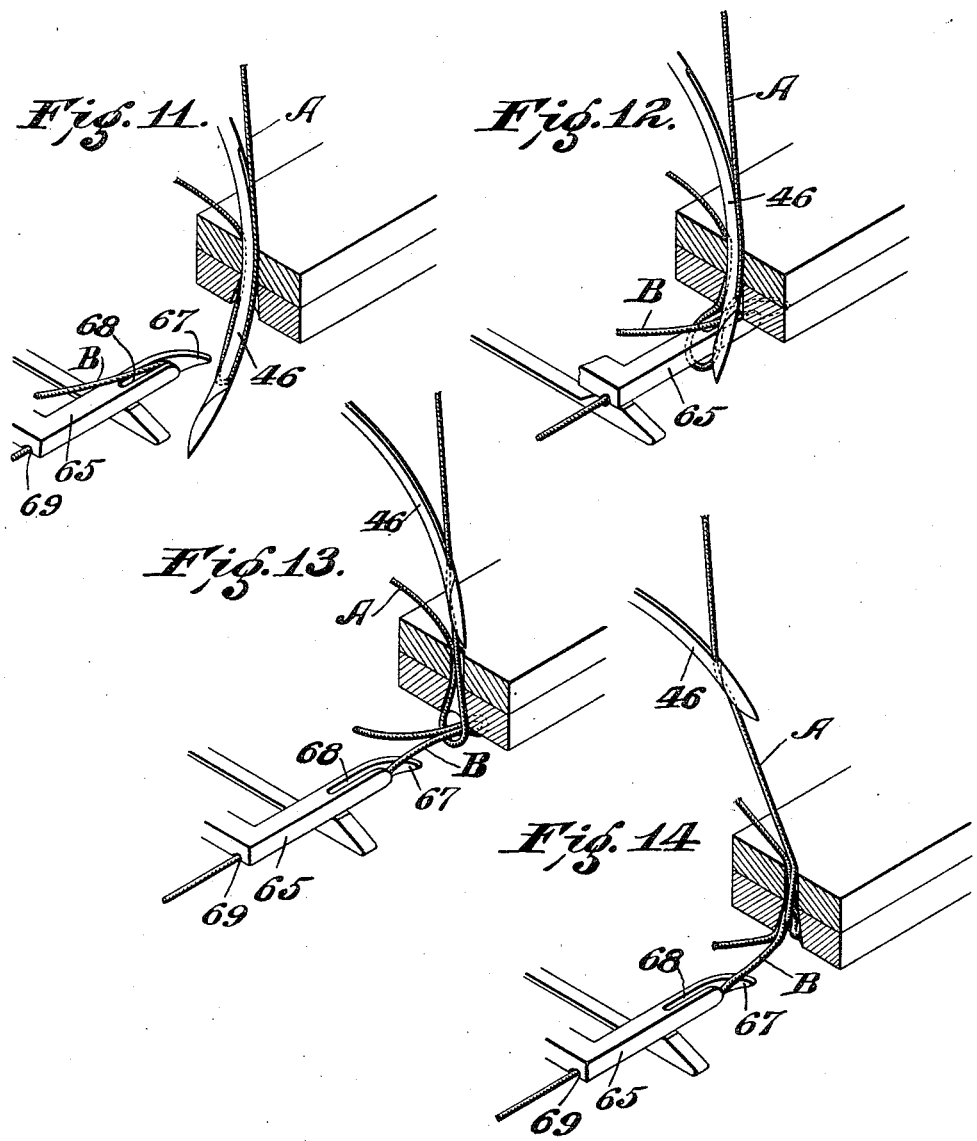

GEORGE S. SAVIGNAC AND CHARLES E. MYERS, OF ST. LOUIS, MISSOURI, ASSIGNORS TO WALTER G. BATTLE, CYRUS E. CLARK, AND THOMAS W. FUQUA, ALL OF ST. LOUIS, MISSOURI.

SEWING-MACHINE.

1,016,898.     Specification of Letters Patent.     Patented Feb. 6, 1912.

Application filed June 11, 1909. Serial No. 501,462.

*To all whom it may concern:*

Be it known that we, GEORGE S. SAVIGNAC and CHARLES E. MYERS, both citizens of the United States, and residents of the city of St. Louis and State of Missouri, have invented certain new and useful Improvements in Sewing-Machines, of which the following is a specification.

This invention relates to sewing machines and more particularly to loop-lock-stitch machines for stitching leather and similar materials.

It has for its principal objects to simplify the construction and operation of such machines; to provide for the making of an improved loop-lock-stitch; to avoid the disadvantages incident to a waxed thread hardening before reaching the stitch-forming mechanism; and to attain other advantages hereinafter more fully appearing.

The invention consists in the parts and in the arrangements and combinations of parts hereinafter described and claimed.

In the accompanying drawings, which form part of this specification, and wherein like symbols refer to like parts wherever they occur, Figure 1 is a front elevation of a sewing machine embodying our invention; Fig. 2 is an elevation of the left-hand side of the machine, showing the relative positions of the parts when the awl and needle are in raised position and the thread-measuring and take-up device is in lowered position; Fig. 3 is an elevation of part of the right-hand side of the machine and a longitudinal vertical section of the rest of the machine, showing the relative positions of the parts when the awl and needle are in lowered position and the thread-measuring and take-up device is in raised position; Fig. 4 is an elevation on an enlarged scale of part of the left-hand side of the machine and a longitudinal vertical section of other parts, showing the relative positions of the parts when the awl, needle and thread-measuring and take-up device are approximately midway between the limits of their raised and lowered positions; Fig. 5 is a top plan view of the carrier for the locking-loop thread; Fig. 6 is an edge view of the carrier for the locking-loop thread partly in section; Fig. 7 is a fragmentary perspective view of a portion of the awl and needle-carrying segment gear with the needle and securing plate therefor detached; Fig. 8 is a view of the needle partly in side elevation and partly in longitudinal section; Fig. 9 is a fragmentary view showing the correlation of the awl-shifting devices; and Fig. 9ª is a similar view showing a modification of the awl-shifting devices; Fig. 10 is a detail view showing the tension device for coöperating with the locking-loop-carrier; Figs. 11 to 14, inclusive, are fragmentary detail views showing the successive positions which the parts of the stitch-forming mechanism assume in making a stitch; and, Fig. 15 is a diagrammatic section through two layers of work showing the positions of the loops before and after the take-up acts to set the stitch.

The machine is mounted upon a base 1 which is preferably provided with short legs or feet 2. This base may in turn be mounted upon any suitable table or stand (not shown). The base 1 is provided at its rear with a standard 3 in the lower portion of which is journaled a driving shaft 4. Upon the outer end portion of this shaft is fixedly mounted a fly-wheel 5 and a grooved pulley 6 adapted to coöperate with a driving belt. A pinion 7 is fixedly mounted on the inner end of the driving shaft and meshes with a gear wheel 8. This gear wheel 8 is fixedly secured on the inner end of a shaft 9, which is journaled in the upper portion of the standard 3. Fixedly secured to the gear wheel 8 or on the shaft 9 is a cam disk or member 10. This cam disk or member is provided in its front face with two continuous cam grooves 11, 12 whose functions will hereinafter more fully appear.

Mounted on the base 1 close to the front face of the cam disk 10 is a vertically-disposed guide-frame or column guides 13 on which is slidably mounted a block or member 14. This block is preferably provided with grooves in its side edges which slidably fit vertical ribs 15 provided therefor on the inner side faces of the guide-frame or column-guides 13. The upper ends of the column-guides are connected by a cross bar or member 16 which is secured by bolts 17. Projecting rearwardly from the block 14 is a stud 18 upon which is journaled a roller 19 which is adapted to fit in the lowermost portion of the cam groove 11 of the disk 10, whereby a vertically reciprocatory motion is imparted to said block when the cam disk 10 is rotated. Preferably, the roller 19 is slightly tapered and the sides of the cam groove 11 are correspondingly inclined.

Mounted on the forward portion of the base 1 is a standard 20 which is preferably stiffened by suitable marginal and intermediate ribs or flanges 21. The upper portion of the standard 20 is formed into a circular casing or housing 22 having flattened side walls; and the housing is preferably divided, or one of its side walls is made removable so that access may be conveniently gained to the interior of the housing. Journaled transversely of the housing is a rock-shaft 23 on which is fixedly mounted an oscillatory needle and awl jaw or carrier comprising a segment gear 24 which is provided with two oppositely-disposed segmental extensions or wings 25, 26. Journaled on a transverse shaft 27 at the rear of the housing is a segment gear 28 which meshes with said segment gear 24. The segment gear 28 is provided with a lever-extension or rock-arm 29 which is pivotally connected to one end of a link-bar 30 whose opposite end is pivotally mounted between a pair of ears or lugs 31 on the front face of the vertically reciprocatory member 14, whereby, when said member is reciprocated vertically, the segment gear 24 and the rock-shaft 23 upon which it is fixed are rocked or oscillated.

The upper front portion of the housing 22 is cut away to provide a space for a work-table or shelf. The work-table or shelf preferably comprises a flat plate 32 having a downturned portion 33 which is secured by screws 34 or by any other desirable means to the side wall of the housing. This plate 32 is provided with a laterally-elongated slot 35 (see Fig. 4) through which the awl and the needle work in a manner hereinafter more fully set forth.

Pivotally mounted on the curved end face of the segmental wing or extension 25 of the segment gear 24 is an awl 36, or a separate awl jaw 36ᵇ (see Figs. 9 and 9ᵃ) which is curved in a circular arc concentric with the rock-shaft 23 and works close to the circular inner face of the bottom of the housing 22. The portion of the awl which enters the work is of substantially the same thickness throughout. One side 37 of the awl (see Fig. 9) is straight and preferably in a plane close to the pivot but the opposite side 38 is inclined away from said first mentioned side for a considerable distance rearwardly from the piercing end thereof. This piercing end is beveled to a straight diagonally-disposed sharp cutting edge 39. The base portion of the awl has, on the inclined side 38, a cam 40 or portion of increased inclination, which cam face is adapted to coöperate with an inclined lug or cam projection 41 provided therefor on the inside of the housing. When the awl is carried forward by the rock shaft 23, the cam face 40 of the awl is moved against the stationary cam face 41, with the result that said awl is swung laterally on its pivot. The cam faces 40, 41 are so positioned that this swinging of the awl is effected just after the awl has pierced the work and while it is still in engagement therewith. By this arrangement, the awl moves or feeds the work intermittently a predetermined distance into position to be again pierced for the next succeeding stitch. On the opposite side 37 of the awl is formed a cam projection 42 which is adapted to coöperate with an adjustable projection or screw-stud 43 provided therefor on the side of the housing 22 adjacent thereto. By this arrangement, the awl is swung laterally on its pivot toward the projection 41, during its downward or rearward stroke and after it has been backed out of the work. By adjusting this projection or screw-stud 43 toward or away from the awl, the length of the stitch may be varied; that is, the cam projection 41 on the casing being fixed, the awl is always shifted laterally in one direction to a certain common position; and by varying the position of the inwardly projecting end of the stud 43, the distance that the awl is shifted toward said cam projection 41 can be varied. Therefore, as the awl is always shifted to a common point in the direction the work is fed, the length of the stitches may be varied at will by merely adjusting the projection or stud 43.

The pivot end portion of the awl is preferably thickened to afford a substantial bearing for the countersunk pivot screw 44 on which it turns; and the segmental member 25 is preferably provided with a spring-pressed member or projection 45 on its bottom face which is adapted to bear upon the awl to keep the same in close relation to the circular inner face of the bottom of the housing 22 and to frictionally hold the awl in its shifted positions.

On the upper segmental wing 26 of the segment gear 24 is mounted a needle 46. The needle is curved in a circular arc of the same radius and center as the curvature of the awl and it is located in position to enter the hole pierced in the work by the awl, after the work has been shifted by the awl. The needle, which is preferably round in cross section, has its pointed end flattened slightly or beveled to correspond to the diagonal inclination of the cutting edge of the awl point. As shown more clearly in Figs. 7 and 8, the needle is provided with an eye 47, with an elongated groove 48 on its outer side which extends from the eye to or nearly to the shank, and with a groove 49 on its inner side which extends from the point of the needle for a short distance rearwardly beyond the eye. These grooves are designed to accommodate the bight of the needle thread A when it is carried by the needle through the hole in the work in a manner hereinafter more fully appearing. The shank 50 of the needle is preferably square in cross section so as to fit in a counterpart pocket or seat 51 in the end of the segmental member 26. Preferably, the shank 50 is notched as at 52 so as to fit over a lug 53 in the seat or pocket 51. The needle is firmly held in place by a segmental securing plate 54 which is fastened in position by a screw 55. This securing plate 54 is fitted into a seat 56 provided therefor in the member 26 and it has a reduced portion 57 adapted to overlie the shank of the needle.

Pivotally sleeved on the rock-shaft 23 is a presser-foot or work-holder 58. The front end of this presser-foot has a lateral or horizontal flange or plate 59 which is slotted to permit the passage therethrough of the awl and of the needle. It also has a rearwardly and upwardly curved arm 60 which is provided at its end with a boss or enlargement 61. The boss 61 is provided with a vertical hole therethrough which is threaded to receive an adjusting screw 62. The end of the screw is adapted to bear against the top of the cross piece 16 of the guide frame 13; so that by adjusting the screw, the presser-foot may be raised or lowered to accommodate different thicknesses of work C, C'. In practice, the presser-foot is adjusted at such a distance above the work-table that the work thereon will be held firmly against vertical movement, but may be moved ahead by the awl for each succeeding stitch without raising the presser-foot therefrom. The upper end portion of the arm 60 of the presser-foot or work-holder 58 is preferably a strong spring so that the work may be held close to the work-table and yet the presser foot will yield sufficiently to compensate for any unevenness in the thickness of the work.

The locking-loop forming mechanism comprises a reciprocatory loop former and carrier 63. This device comprises an elongated body portion which is slidably mounted in a transverse horizontal groove or guideway provided therefor in the work-table, and it is retained therein by a cover-plate 64. The member 63 has a laterally-disposed extension or hook 65 spaced therefrom and arranged to travel therewith across the table close to the inner side of the needle. The end portion of this hook is pointed and curved downwardly and outwardly as at 67 and has a notch or recess 66 in its outer side (see Figs. 5 and 6). A short longitudinal groove 68 is provided in the upper face of the hook 65 and this groove communicates with the notch or recess 66 whose edges are rounded so that the locking-loop thread B may be passed over them without cutting or fraying. On the underside of the hook 65 is a groove 69 which extends the entire length thereof. This groove 69 is provided to accommodate the locking-loop thread B which is fed through a notched opening provided therefor in the depending side 33 of the work-table, said notched opening spanning the groove; that is, the locking-loop thread B is inserted through the opening and passed along said groove 69. It is then carried up through the notch 66 of the hook and laid in the groove 68. The part of the thread B thus looped around the hook constitutes the locking-loop, which is carried through the loop of the needle thread A in a manner hereinafter more fully appearing.

The end of the loop carrier 63 opposite to the hooked end is provided with a pair of downturned lugs or ears 70 (see Fig. 6) on which is mounted a cross pin 71. This pin engages the bifurcated or slotted end portion of a rock-arm 72 which is fixedly secured on the forward end of a longitudinally arranged horizontal rock-shaft 73. This shaft 73 is journaled near the front of the machine in a bearing 74 while its rear end portion is journaled in a bearing provided therefor in the base of the guide-frame 13. The rear side of the guide-frame 13 is preferably cut away to provide space for a lever-arm 75 which is fixedly secured on the end of the shaft 73; and the lever-arm is provided at its free end with a stud or roller 76 which works in the cam groove 12 of the disk 10. The cam groove 12 extends concentrically around the cam disk 10 except for a short distance as at 77 (see Fig. 1), where it is gradually inclined outwardly to a point and then turns abruptly back to its circular portion. This outwardly inclined cam portion is so positioned with relation to the cam groove 11 that the lever-arm 75 is moved outwardly and thereby actuates the rock-shaft 73 and its arm 72. This rock-arm 72 in turn moves the locking-loop carrier 63 across the inner side of the needle, as said needle is starting on its upward stroke. By reason of the pressure of the material of the work upon the thread in the groove on the inner side of the needle, the bight or loop of the needle thread A opens inwardly as the needle backs out of the work.

The operation of so much of the machine as has been described is as follows: The work is placed upon the work-table and the presser foot is adjusted to hold the work, C, C' to the table. Then the cam disk 10 is rotated and the block 14 is thereby reciprocated; and, through the gear connections, the awl and needle carrier is oscillated. Assuming the parts to be in the positions shown in Fig. 3, the awl will first be carried upwardly to pierce the work C, C'. Near the end of the upward stroke of the awl, the cam face 40 rides over the cam projection 41 and the awl is shifted laterally to feed the work and thereby bring the puncture therein into position to receive the needle after the awl shall have backed out of the work. As the awl approaches the end of its downward stroke, the cam projection 42 thereon rides over the end of the screw stud 43 and the awl is shifted laterally into position to pierce the work for the next stitch. The needle, on its downward stroke, carries a bight of its thread A through the work C, C', and as the needle backs out of the work, the bight of its thread is opened, as shown in Fig. 12. While the loop of the needle thread A is opening, the carrier or hook 65 carries the locking-loop thread B through the same and then backs quickly out, leaving the locking-loop extending through the needle loop, as shown in Fig. 13. The stitch is then drawn tight or set by pulling upon the needle thread A, which operation is preferably accomplished by a thread-measuring and take-up device hereinafter more fully described. When the locking-loop-carrier backs out of the needle thread loop, said locking-loop is kept from following the carrier by the tension thereon of the needle thread which at this stage of the operation, is starting to pull under the carrier. To prevent that portion of the locking-loop thread which lies in the groove in the underside of the carrier outside of the needle thread loop from pulling the locking-loop out of the needle thread loop, it is preferable to provide a resilient thread escapement device or pawl 78 which is mounted in coöperative relation to the thread-carrier 63. Preferably, this thread escapement is mounted on the outside of the housing or casing 22, for convenience in manipulation. This escapement device, as shown in Fig. 10, is provided with a spring shank portion which is preferably attached to a stud 79 or other suitable device adapted to secure the same to the machine. The free end portion of the member 78 is thickened and beveled as at 80 and a notch 81 is provided in its upper face. At the inner end of the notch 81 is provided a projection or lug 82 whose top edge portion is curved to correspond substantially to the groove 69 in the underside of the carrier hook 65 and into which it normally projects so as to bear upon the locking-loop thread as the same is pulled through the groove. The outer side face of the lug 82 is preferably beveled or inclined toward the bottom of the notch.

In practice, the tension of the device is just sufficient to permit the thread to be drawn thereover when the thread-hook moves to carry the locking-loop into the needle thread loop, but it will prevent the thread, which has been pulled by the hook, from following the hook on its return stroke.

The measuring and take-up device for the needle thread comprises an arm 83 which is fixed tightly on the rock-shaft 23; and which is so set with respect to the needle carrier segment 26 that it is in its lowermost position when the needle carrier segment is in its uppermost position. The arm 83 is provided near its outer end with a circular portion 84 having a curved marginal flange or rib 85 on its outer side. The inner side of the flange or rib 85 is curved eccentrically with respect to the center of the circular portion 84 of the arm 83. Pivotally mounted on a stud 86 located at the center of the circular portion 84 is a cam disk 87 whose high side or portion which coöperates with the eccentric side of the rib 85 is preferably serrated or scalloped as at 88. Pivotally mounted on the outer end of the arm 83 is a lever-arm 89 which has a slot 90 therein which coöperates with a stud 91 on the cam disk 87. The free end of the lever arm 89 is for convenience turned at an angle as at 92 and it is rounded or pointed so as to coöperate with a resilient latch member 93. This latch member is mounted on an arcuate extension 94 of a bracket 95 which is mounted on the top of the casing 22. The bracket extension 94 is preferably suspended laterally from the casing so as to be in convenient position relative to the arm 83. On the free end of the latch member 93 is provided a lug having a tapered or beveled side cam face 96 and a curved or grooved top cam face 97 (see Figs. 1, 2 and 4). The opposite end of the latch member is secured to the bracket extension by a screw or rivet 98 and it is additionally supported by a pin 99, upon which its intermediate free portion slidably rests.

Assuming the parts just described to be in the position shown in Fig. 2: When the arm 83 is swung upwardly, the end portion 92 of the lever-arm 89 rides over the cam face 96 of the lug on the end of the resilient latch member 93, thereby pressing said member inwardly until said lever-arm has passed free of said lug. When the arm 83 swings downwardly on its return stroke, the end of the lever-arm 89 contacts with and rides over the grooved cam portion 97 of the latch member, whereby said lever-arm is shifted and, owing to its slot-and-pin connection with the cam disk 87, the disk is turned until its high side contacts with the inner face of the curved rib 85, as shown in Fig. 4. As the arm 83 continues its downward movement a projection 100 on the cam disk 87 contacts with a projection 101 on the bracket extension 94, whereby the cam disk 87 is turned and restored to open or inoperative position, the lever 89, of course, being also restored therewith to the position shown in Fig. 2. The projection 101 is preferably provided on a slotted plate 102 which is secured in adjusted position on the bracket extension 94 by a screw 103 or other suitable securing device. By adjusting the projection 101 to different positions peripherally of the arcuate bracket extension 94, the cam disk 87 may be made to move out of contact with the rib 85 at different intervals from the tripping lug on the end of the latch member 93, and thereby the amount of the needle thread taken up in the stitch may be varied, as hereinafter more fully described.

In order to releasably hold the cam disk 87 in open position, as shown in Fig. 2, a spring-latch or retainer 104 is provided on the circular portion 84 of the take-up arm 83. This retainer preferably comprises a curved leaf-spring which is provided with a V-shaped end portion which is adapted to fit in front of a shoulder 105 provided on the cam disk 87 adjacent to the projection 100. By this arrangement, the angular end portion of the spring will ride up over the shoulder when the cam disk is forcibly turned; and it will snap back into place in front of the shoulder when the cam disk is restored to open position, yet the resiliency of the spring is sufficient to hold the disk against accidental movement.

In the operation of the thread-measuring and take-up device just described, the needle-thread is taken from some conveniently arranged source of supply, preferably, from a spool holder 111 mounted or supported beneath the base 1 of the machine. The thread is carried through an opening 106 in the base (see Fig. 4) and thence through an ordinary tension device 107 which may be conveniently mounted on the base or guide-frame 13, as shown. It is then carried under a suitable guide piece or clip 108 on the lower end portion of the rib 85 on the take-up arm 83, thence between the inner side of said rib and the cam disk 87, thence through a slitted guide-opening 109 in the upper end portion of the rib 85, thence over a grooved idler or pulley 110 on the top of the casing 22, and thence over the outer side of the curved needle 46 and through the eye 47 of the needle. It is preferable, however, to pass the thread through a waxing or treating device which is preferably located between the idler 110 and the needle hereinafter more fully set forth.

When the needle 46 moves downwardly, it carries a bight of the thread A with it. The end of the thread or portion thereof which is secured in the preceding stitch is, of course, tightly held, and, therefore, the thread from the supply spool is pulled through the tension device and the take up device and over the idler or pulley. It is noted, also, that the take-up arm moves upwardly simultaneously with the downward movement of the needle. The tripping or latch member is so located that immediately, or shortly after, the take-up arm starts on its return or downward stroke, the lever arm 89 is actuated and the cam disk 87 binds the thread against the rib 85 on the take-up arm. The thread is then pulled until the cam disk 87 is released from the thread by the projection 100 on said disk contacting with the projection 101 on the bracket extension 94. It is during this pulling action on the thread by said take-up device that the stitch hereinbefore described is tightened or set. The length of the thread used to form and set the stitch is controlled by the distance between the projection 101 and the tripping cam 97 on the member 93; and as hereinbefore stated, said projection 101 may be adjusted at will with relation to said tripping cam 97 in order to measure the proper length of thread to suit different thicknesses of work or lengths of stitches.

The locking-loop thread B is preferably supplied from a spool mounted on a holder 111ª located conveniently beneath the base 1. The supply of thread-waxing or treating material is also preferably located beneath the base 1. A supporting bracket 112 is, therefore, secured to the under side of the base. It has two oppositely disposed arms 113, 114 on which the spool holders 111, 111ª are mounted. It also has a depending portion 115 to which a supply tank or reservoir 116 is secured.

The thread-waxing or treating material is used in a fluid state, preferably an ethereal solution of a viscid substance or cement which becomes hardened when exposed to the atmosphere. This material is filled into the lower portion of the reservoir 116 through a suitable nipple or filling tube 117 which can be tightly closed by a screw-plug 118. Leading from the bottom portion of the reservoir is a pipe 119 in which is located a suitable cut-off or valve 120. At the top of the reservoir 116 a valved nipple or tube 121 is provided through which air may be forced into the reservoir and compressed above the liquid material therein so that, when the valve 120 in the pipe 119 is opened, the liquid in the reservoir will be forced out through said pipe.

The pipe 119 is extended upward and connected by a suitable coupling 122 to a depending pipe extension 123 of an elongated tubular valve-casing 124 which is located near the top side of the base 1. In this tubular valve-casing is rotatably fitted a tubular valve 125 which is closed by a plug 126 at its inner end, as shown in Fig. 4. The plug is tightly fitted into the end of the tubular valve and it is provided with an annular shoulder or collar 127 which bears against the end of the valve casing and serves to retain the valve therein. The valve is provided with an opening 128 which is arranged to register with the pipe extension 123; and it is also provided with an opening 129 which is arranged to register with a pipe 130 which leads from the valve casing to a thread-guide and waxing or treating device 131. The two openings 128, 129 in the valve and pipes 123, 130 are arranged so that in one position of the valve, communication is established between the reservoir 116 and the device 131 through the pipe 119, pipe 123, valve 125 and pipe 130.

The waxing or treating device 131 (see Fig. 4) comprises an elongated downwardly and outwardly extending member 132, which is preferably cylindrical or round in cross section. The member 132 is provided with a longitudinal groove 133 in the outer portion of its surface. The bottom of this groove is preferably inclined toward the lower end of the member which is set at an angle so that the bottom of the groove is on a line substantially tangential to the outer side of the curved needle 46. The intermediate portion of the bottom of the groove is recessed or channeled slightly, as at 134; and into this channeled portion the pipe 130 communicates through an opening 135 in the upper portion of the member 132.

Slidably fitted on the member 132 is a sleeve 136 having an inclined longitudinal rib 137 which is adapted to fit in the groove 133 in said member 132. The inclination of the edge of the rib corresponds to the inclination of the bottom of the groove so that the two surfaces are in parallel relation. By moving the sleeve 136 lengthwise on the member 132 the distance between the bottom of the groove and the edge of the rib may be widened and lessened when desirable or necessary. That is, when the sleeve 136 is moved inwardly on the member 132, the edge of the rib is brought closer to the bottom of the groove and when it is moved outwardly, the space between the edge of the rib and bottom of the groove is widened. A rib or other suitable grasping piece 138 may be provided on the outer side of the sleeve 136 for conveniently manipulating the device.

In practice, it is preferable to pass the needle thread A through the waxing or treating device at all times whether the thread is to be waxed or treated or not. Provision has, therefore, been made to shut off the supply of waxing or treating material at the will of the operator as hereinafter described. In the operation of the device, the sleeve 136 is removed from the member 132 and the end portion of the needle thread A is laid in the groove 133 in said member 132. The sleeve is then slipped onto the member 132 until the thread is slightly compressed between the bottom of the end portions of the groove and the edge of the rib, which is fitted in said groove. The pressure on the thread is sufficient to produce a slight resistance when said thread is pulled through the waxing or treating device. The end of the needle thread A is, of course, passed through the eye of the needle 46 and the stitches are made in the manner hereinbefore set forth. If it is desired to wax or treat the thread that goes into the work, the valve 125 is turned to open communication between the reservoir 116 and the device 131, whereupon the liquid material will be forced from the reservoir by the air pressure behind it. As the thread is pulled through the device 130, it becomes saturated or coated, depending upon the nature and consistency of the material which flows into the channel portion of the groove in the member 132 under pressure. The lower coöperating portions of the rib 137 and the member 132 serve as a stripper to remove surplus material from the thread as it leaves the device, and also prevent the material from leaking or oozing out when the device is properly adjusted or tightened on the thread. When it is desired to use a dry or untreated thread, it is only necessary to turn the valve 125 to shut off the supply of liquid material from the reservoir.

The waxing or treating device for the locking-loop thread B comprises a receptacle or chamber 139. This receptacle is preferably mounted on the valve casing 124 and communicates with the interior thereof through an opening 140 which is arranged to register with an opening 141 in the tubular valve 125. When it is desired to fill, or partially fill, the receptacle for reasons hereinafter more fully appearing, the valve is turned to open communication through its opening 141 and opening 140 into the receptacle 139. The liquid material from the reservoir will then be forced up into the receptacle and when the necessary amount shall have been supplied thereto, the valve is turned to close communication between the receptacle and the reservoir.

The cover 142 of the receptacle 139 is made detachable and may be secured in any desirable manner. Slidably mounted in a vertical opening in the cover 142 is a thread holder and guide comprising a rod 143 having a bent or laterally turned end portion 144 which is looped or provided with an eye 145 through which the locking-loop thread B is passed. On the outer end of the rod 143 is a knob 146 whereby the same can easily be manipulated. In order to hold the rod in lowered or immersed position, a hooked lateral extension 147 is provided on the outer end portion thereof so as to engage in a loop or retaining device 148 secured to the top of the receptacle. The thread B is taken up through the opening in the base 1 from the supply spool on the holder 111ª, thence inwardly through a curved tube 149 in the top of the receptacle 139, thence through the loop 145 on the lower end of the rod 143, thence outwardly through a straight tube 150 in the top of the receptacle, and thence to the locking-loop carrier hook 65. When it is desired to wax or treat the thread B, the rod 143 is lowered so as to immerse its loop or its eye 145 in the liquid material in the receptacle, so that said thread is likewise immersed as it passes through said loop or eye at the lower end of the rod 143. When it is desired to use a dry or untreated thread, the rod 143 is raised to bring the bent end 144 close to the top of the receptacle and above the level of the liquid therein.

The openings 128, 129 and 141 in the valve 125 are so arranged that when communication is established between the reservoir 116 and the waxing device 131, communication is cut off between the reservoir and the receptacle 139 and vice versa; and that the valve may be turned to cut off communication between both the waxing device 131 and the receptacle 139 at the same time. To indicate the proper positions of the valve the handle portion 151 thereof is provided with a pointer or indicator 152 which is adapted to coöperate with a dial 153 on the outer end of the valve casing 124.

In Fig. 15, of the drawings, two layers C, C' of leather or similar material are shown stitched together according to this invention. As shown at the right-hand side of said Fig. 15, the puncture in the lower layer C' is tapered or outwardly flared as at 154, while the puncture in the upper layer is straight and of a width corresponding to the inner end of the puncture in the lower layer. In practice, for stitching shoe soles to welts and similar work, it is preferable to use a six-cord linen thread for the upper or needle thread and a ten-cord cotton thread for the bottom or locking-loop thread. In the finished work, there will be four strands of the locking-loop thread and two of the needle thread pulled into a knot in the wedge-shaped puncture in the lower layer C', while there will be only two strands of the needle thread lying in the puncture in the upper layer C. As the thread is usually treated or waxed with a solution of the waxing or cementing material in a volatile solvent whose evaporation causes said material to harden or set, the hardened knot forms substantially a tapered head or peg which will not pull through the puncture in the upper layer when the locking-loop thread is cut or broken between the stitches. A shoe sole stitched according to the invention can be worn close down to the welt without the stitches ripping, and the sole is more flexible than the ordinary lock-stitched and loop-lock-stitched soles, as the thread between the stitches need not be drawn as tight as it is necessary in the ordinary stitching. Moreover, it is not necessary to channel the bottom of the sole to accommodate the bottom thread between the stitches. The soles may be sand-papered and the bottom threads between the stitches obliterated from the surface, if desired, in which case the sole will not readily rip loose from the welt. As above stated, a linen thread is needed for the upper or needle thread only and a much cheaper cotton thread may be used for the locking-loop thread. Hence, there is a saving in cost without sacrificing the quality and durability of the work.

In practice, as the tapered portion of the awl is forming the wedge-shaped puncture in the lower or sole layer C', the material surrounding the knot formed in the preceding stitch is pressed and closed tightly about the knot, thus adding further to the advantages of the peculiar form of stitch.

In Fig. 9ª the awl proper or puncturing portion 36ª is detachably mounted on an oscillatory awl-carrier or jaw 36ᵇ, which is adapted to be pivotally mounted on the segmental extension 25 of the oscillatory needle-carrying segment 24 in a manner similar to the integral awl and carrier 36. In this case, the awl-carrier is provided at its end with a pocket or seat in which a counterpart projection or shank 36ᶜ on the awl is adapted to fit or interlock in any desirable manner. This separate awl jaw is arranged and adapted to be pivotally mounted and actuated in a manner similar to the integral awl and jaw 36. By this arrangement, the awls may be made in various sizes and interchangeable to suit different work, and in case of breakage a new awl may be readily substituted.

Obviously, the machine and the peculiar form of stitch can be used for purposes other than sewing shoe soles to welts. They may be used for sewing heavy leather generally, in shoe making, harness making and for many other uses, and for repair work. So, too, the machine admits of considerable modification without departing from this invention. Therefore, we do not wish to be limited to the specific constructions and arrangements shown.

What we claim as our invention and desire to secure by Letters Patent is:

1. A sewing machine comprising a worktable, means for holding the work thereon, a rocking carrier, an awl pivoted on said rocking carrier and arranged to oscillate independently thereof and in a direction substantially at right angles to the direction of movement of said rocking carrier, means for rocking said carrier to reciprocate said awl longitudinally to puncture the work, and means for intermittently oscillating said awl on said carrier to feed the work for each successive stitch, said means comprising a cam on one side of the awl and a coöperating element on a stationary part of the machine, whereby the awl is moved in the direction to feed the work during its puncturing stroke, and a cam on the opposite side of the awl adapted to coöperate with a second element on a stationary part of the machine, whereby the awl is restored to puncturing position during its reverse stroke.

2. A sewing machine comprising a work table, means for holding the work thereon, a rocking carrier, an awl pivoted on said rocking carrier and arranged to oscillate independently thereof and in a direction substantially at right angles to the direction of movement of said rocking carrier, means for rocking said carrier to reciprocate said awl longitudinally to puncture the work, means for shifting said awl on its pivot while it is in the work, said means comprising a cam face on one side of the awl and a coöperating cam face on an adjacent part of the machine, and means for restoring the awl to its puncturing position after it has backed out of the work, comprising a cam on the opposite side of the awl and a coöperating element on an adjacent part of the machine, whereby said awl intermittently feeds the work for each successive stitch.

3. A sewing machine comprising a worktable, means for holding the work thereon, a rocking carrier, an awl pivoted on said rocking carrier and arranged to oscillate independently thereof and in a direction substantially at right angles to the direction of movement of said rocking carrier, means for rocking said carrier to reciprocate said awl longitudinally to puncture the work, means for shifting said awl on its pivot while it is in the work, said means comprising a cam on one side of the awl and a coöperating cam on an adjacent stationary part of the machine, and means for restoring the awl to its puncturing position after it has backed out of the work, said means comprising a cam on the opposite side of the awl and an adjustable coöperating element on an adjacent stationary part of the machine, whereby said awl intermittently feeds the work for each successive stitch, and whereby, also, the length of the stitch may be varied.

4. A sewing machine comprising a work table, means for holding the work thereon, a rocking carrier, an awl pivoted on said rocking carrier and arranged to oscillate independently thereof and in a direction substantially at right angles to the direction of movement of said rocking carrier, means for rocking said carrier to reciprocate said awl longitudinally, means for positively shifting the awl on its pivot in one direction to a fixed point while it is in the work, said means comprising a cam on one side of the awl and a fixed coöperating cam on an adjacent stationary part of the machine, and means for restoring the awl to puncturing position after it has backed out of the work, said means comprising a cam on the opposite side of the awl and a coöperating projection on an adjacent stationary part of the machine, whereby said awl intermittently feeds the work for each successive stitch, said projection which coöperates with the second mentioned cam on the awl being adjustable toward and away from the awl to vary the puncturing position of the awl.

5. A sewing machine comprising a worktable, means for holding the work thereon, an oscillatory awl and needle carrier, an arcuate needle mounted on said carrier, an arcuate awl pivotally-mounted on said carrier, said needle and said awl being curved on the same radius and center and oppositely disposed, the frame of the machine having thereon a curved face corresponding to the peripheral face of the awl and upon which the awl slides, means for oscillating said carrier to alternately move the awl and needle through the work, means for shifting said awl on its pivot while it is in the work, said means comprising a cam on one side of the awl and a coöperating cam on the adjacent portion of the frame, and means for restoring the awl to its puncturing position after it has backed out of the work, said restoring means comprising a cam on the opposite side of the awl and a coöperating element on the adjacent portion of the frame, whereby said awl intermittently feeds the work to bring the puncture therein into the path of the needle.

6. A lock-loop-stitch sewing machine comprising a work table, means for holding the work thereon, an oscillatory awl and needle carrier, an arcuate needle mounted on said carrier, said needle having an eye near its end through which a thread is looped, an arcuate awl pivotally mounted on said carrier, said needle and said awl being curved on the same radius and center and oppositely disposed, the frame of the machine having a curved face corresponding to the curvature of the peripheral face of the awl and upon which the awl is adapted to slide, means for oscillating said carrier to alternately move the awl and needle through the work, means for shifting said awl on its pivot while it is in the work, said shifting means comprising a cam on one side of the awl and a coöperating cam on the adjacent portion of the frame, means for restoring the awl to its puncturing position after it has backed out of the work, said restoring means comprising a cam on the opposite side of the awl and a coöperating element on the adjacent portion of the frame, whereby said awl intermittently feeds the work to bring the puncture therein into the path of the needle, said needle being adapted to carry a bight of thread through the puncture and to open said bight on its return stroke, a horizontally-movable locking-loop-carrier adapted to lay a bight of thread through said opened bight of the needle thread, and means for pulling said needle thread to interlock and draw said two bights of thread into the puncture in the work.

7. A sewing machine, comprising a work-table, means for holding the work thereon, an oscillating needle and awl carrier, an arcuate needle mounted on said carrier, an arcuate awl pivotally mounted on said carrier, said needle and said awl being curved on the same radius and same center, a segment gear on said needle and awl carrier, a second segment gear meshing with said first-mentioned segment gear, a lever-arm fixed to said second-mentioned segment gear, a vertically-movable member, a pivotal link connection between said lever-arm and said vertically-movable member, a rotatable member having a cam groove therein, a working connection between said vertically movable member and said cam groove, and means for actuating said rotatable member.

8. A sewing machine comprising a work-table, means for holding the work thereon, an oscillatory needle and awl carrier, an arcuate needle mounted on said carrier, an arcuate awl pivotally mounted on said carrier, a segment gear fixed to said oscillatory carrier, a second segment gear meshing with said first-mentioned segment gear, a lever-arm fixed to said second-mentioned segment gear, a vertically-movable member having a pivotal link connection between said lever-arm and said vertically-movable member, a rotatory member having a cam groove therein, a working connection between said cam groove and said vertically movable member, means for actuating said rotatory member, means for shifting said awl laterally while it is in the work, and means for restoring the awl to its puncturing position after it has backed out of the work, whereby said awl intermittently feeds the work to bring the punctures into the path of the needle.

9. A sewing machine comprising a work-table, means for holding the work thereon, an oscillatory awl and needle carrier, a segment gear on said carrier, a second segment gear meshing with said first-mentioned segment gear, a lever-arm on said second-mentioned segment gear, a reciprocatory member having a pivotal link connection with said lever-arm, a rotatory member adjacent to said reciprocatory member, said rotatory member having a cam groove therein, a working connection between said cam groove and said reciprocatory member, and means for actuating said rotatory member, whereby said oscillatory awl and needle carrier is actuated, an arcuate needle mounted on said carrier, an arcuate awl pivotally mounted on said carrier and adapted to puncture the work, means for shifting said awl laterally while it is in the work, and means for restoring the awl to puncturing position after it has backed out of the work, whereby the awl intermittently feeds the work to bring the punctures successively into the path of the needle, and said needle being adapted to carry a bight of thread successively through each of the punctures, and a locking-loop-carrier comprising a reciprocatory member adapted to carry a bight of thread successively through each of said first-mentioned bights of thread after the same are passed through the work, a rock-arm operatively connected to said locking-loop-carrier and mounted on a rock-shaft having a second rock-arm thereon, said second-mentioned rock-arm having a working-connection with a second cam groove in said before-mentioned rotatory member, the cam grooves in said rotatory member being so arranged with respect to each other that said locking-loop-carrier reciprocates through the needle-thread loop as the needle starts to back out of the work.

10. A sewing machine comprising a rocking awl-carrier, an awl pivoted on said carrier and arranged to oscillate independently thereof and in a direction substantially at right angles to the direction of movement of said carrier, means for actuating said carrier to reciprocate said awl longitudinally, means for shifting said awl alternately in opposite directions during the reciprocation thereof, and a resilient device on said carrier arranged to bear upon said awl to hold the same between the oscillations thereof.

11. In a machine of the class described, a horizontally journaled rocking element, an awl pivoted thereon and arranged to oscillate independently thereof and in a direction substantially at right angles to the direction of movement of said rocking element, means for rocking said element to reciprocate said awl longitudinally to puncture the work, and means whereby the awl is caused to swing on its pivot during the movement of the rocking element to effect a shifting movement of the work through which the awl passes, said last mentioned means comprising a cam on one side of the awl and a cam on an adjacent stationary part of the machine, whereby the awl is moved to feed the work, and a cam on the opposite side of the awl and a coöperating element on an adjacent stationary part of the machine, whereby the awl is restored to puncturing position.

In testimony whereof, we have signed our names to this specification in the presence of two subscribing witnesses this 9th day of June, 1909, at St. Louis, Mo.

GEORGE S. SAVIGNAC.
CHARLES E. MYERS.

Witnesses:
G. A. PENNINGTON,
J. B. MEGOWN.

Copies of this patent may be obtained for five cents each, by addressing the "Commissioner of Patents, Washington, D. C."